(12) United States Patent
Facius

(10) Patent No.: US 8,064,114 B2
(45) Date of Patent: Nov. 22, 2011

(54) ILLUMINATION DEVICE AND METHOD FOR ILLUMINATING UNIFORMLY AN IMAGE GENERATING MICRO DISPLAY

(75) Inventor: Zoltan Facius, Kernen (DE)

(73) Assignee: SONY Deutschland GmbH, Berlin (DE)

( * ) Notice: Subject to any disclaimer, the term of this patent is extended or adjusted under 35 U.S.C. 154(b) by 546 days.

(21) Appl. No.: 12/041,287

(22) Filed: Mar. 3, 2008

(65) Prior Publication Data

US 2008/0247016 A1 Oct. 9, 2008

(30) Foreign Application Priority Data

Mar. 31, 2007 (EP) .................................... 07006775

(51) Int. Cl.
*G02B 5/32* (2006.01)
(52) U.S. Cl. ............. 359/15; 359/28; 359/292; 359/599
(58) Field of Classification Search ................. 359/9, 15, 359/28, 227, 290, 292, 296, 599, 889, 209.1, 359/211.6, 217.4, 566, 569; 362/246, 311.01, 362/351, 355
See application file for complete search history.

(56) References Cited

U.S. PATENT DOCUMENTS

| | | |
|---|---|---|
| 5,272,473 A | 12/1993 | Thompson et al. |
| 6,011,643 A | 1/2000 | Wunderlich et al. |
| 6,122,023 A | 9/2000 | Chen et al. |
| 6,154,259 A | 11/2000 | Hargis et al. |
| 6,248,487 B1 * | 6/2001 | Cohn et al. ...................... 430/30 |
| 6,747,781 B2 * | 6/2004 | Trisnadi ......................... 359/559 |
| 6,791,739 B2 | 9/2004 | Ramanujan et al. |
| 7,193,765 B2 * | 3/2007 | Christensen et al. .......... 359/279 |
| 7,400,449 B2 * | 7/2008 | Christensen et al. .......... 359/566 |
| 2008/0298424 A1 * | 12/2008 | Khan et al. .................... 372/107 |

FOREIGN PATENT DOCUMENTS

| | | |
|---|---|---|
| CN | 1721963 A | 1/2006 |
| EP | 1 283 434 A2 | 2/2003 |
| EP | 1 734 771 A1 | 12/2006 |
| WO | WO 2006/133937 A1 | 12/2006 |
| WO | WO2007015141 A2 * | 2/2007 |

OTHER PUBLICATIONS

Wang et al., "Speckle reduction in laser projection systems by diffractive optical elements", Applied Optics, vol. 37, No. 10, Apr. 1, 1998, pp. 1770-1775.*

Trisnadi, "Hadamard speckle contrast reduction", Optics Letters, vol. 29, No. 1, Jan. 1, 2004, pp. 11-13.*

(Continued)

*Primary Examiner* — Frank G Font
(74) *Attorney, Agent, or Firm* — Oblon, Spivak, McClelland, Maier & Neustadt, L.L.P.

(57) ABSTRACT

An illumination device for uniformly illuminating an image generating micro-display that includes a coherent light source, a beam shaping and speckle reduction device located on an optical path between said coherent light source and said image generating micro-display, wherein the beam shaping and speckle reduction device includes a dynamic diffractive optical element, and a processor which is configured to control said dynamic diffractive optical element so that a sequence of different hologram patterns is generated on said dynamic diffractive optical element, the different hologram patterns being uncorrelated to each other.

23 Claims, 7 Drawing Sheets

OTHER PUBLICATIONS

Chris Slinger, et al., "Electrically controllable multiple, active, computer-generated hologram", XP 000699837, Optics Letters, vol. 22, No. 14, Jul. 15, 1997, pp. 1113-1115.

Sven Krueger, et al., "Liquid crystal display as dynamic diffractive element", XP-002445802, Proceedings of SPIE, vol. 4294, 2001, pp. 84-91.

Lingli Wang, et al., "Speckle reduction in laser projection systems by diffractive optical elements", XP-000754330, Applied Optics, vol. 37, No. 10, Apr. 1, 1998, pp. 1770-1775.

Jahja I. Trisnadi, "Hadamard speckle contrast reduction", XP-002445803, Optics Letters, vol. 29, No. 1, Jan. 1, 2004, pp. 11-13.

English Translation of Chinese Office Action issued Jan. 26, 2011, in Patent Application No. 200810088488.2.

Office Action issued Aug. 25, 2011 in European Patent Application No. 07 006 775.6-2217 filed Mar. 31, 2007 (5 pages in English language).

* cited by examiner

ILLUMINATION DEVICE AND METHOD FOR ILLUMINATING UNIFORMLY AN IMAGE GENERATING MICRO DISPLAY

The invention relates to an illumination device illuminating an image generating micro display. The invention also relates to an image generating device, to a method for illuminating uniformly an image generating micro display and a computer program product, respectively.

BACKGROUND

Display devices become more and more important in electronic equipment and customer devices. Therefore, the technical development also focuses on processes and devices of illumination, image generation and projection.

In current illumination systems light is guided and shaped in a way to illuminate an image forming device uniformly and static. Usually these illumination systems contain many optical products to shape and uniform the light emitted from a non-uniform light source. Further, speckle and other interferences caused by the illumination system, which uses coherent light, destroys the image quality with nonuniformity.

It is an object of the invention to avoid such problems.

The object is solved by an illumination device, an image generating device, a method and a computer program product according to claims 1, 13, 14, and 20, respectively.

Further embodiments are defined in the dependent claims.

Further details of the invention will become apparent from a consideration of the drawings ensuing description.

DETAILED DESCRIPTION

In the following, embodiments of the invention are described. It is important to note, that all described embodiments in the following may be combined in any way, i.e. there is no limitation that certain described embodiments may not be combined with others.

Figure 1:
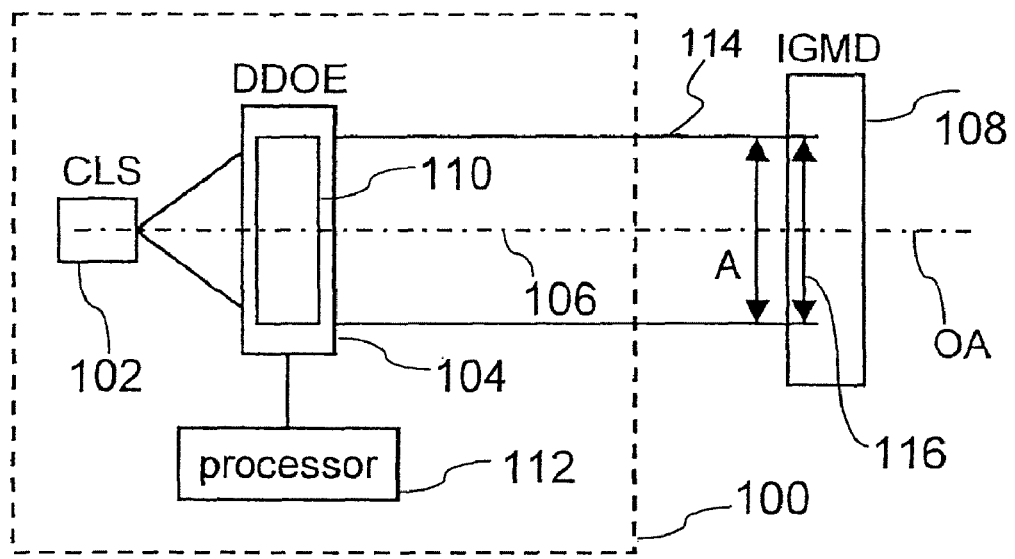
FIG. 1 shows an illumination device for uniformly illuminating an image generating micro display.

In FIG. 1 a first embodiment of an illumination device 100 is depicted, which comprises a coherent light source 102 and a beam shaping and speckle reduction device 104 located on an optical path 106 between the coherent light source 102 and an image generating micro display 108, wherein said beam shaping and speckle reduction device 104 comprises a dynamic diffractive optical element 110, which is controlled by a processor 112, so that a sequence of different hologram patterns is generated on said dynamic diffractive optical element 110, and said different hologram patterns are uncorrelated to each other.

Such hologram patterns might also be referred to by "computer generated holograms (CGH)" and are used to change the illumination characteristics of a coherent light beam emitted by said coherent light source 102 so that in an active area of the image generating micro display 108 is uniformly illuminated, so that a light profile with cross section A of the coherent light beam 114 is adapted to an active surface area of the image generating micro display 108.

While using the sequence of uncorrelated hologram patterns on the dynamic diffractive optical element 110 different speckle patterns are generated on an active surface area of the image generating micro display 108. Since the speckle pattern changes with the changing hologram patterns the active area of the image generating micro display is illuminated with different speckle patterns, so that over a sequence of hologram patterns the intensity of incident light is more evenly distributed on the active surface area of the image generating micro display 108.

Such image generating micro displays 108 may comprise, but are not restricted to, reflective or transmissive liquid crystal device (LCD) micro displays, liquid crystal on silicon (LCOS) micro displays, transmissive high temperature polysilicon TFT (thin film transistor) LCD micro displays. With this embodiment there is no moving optical device within the illumination device 100 which otherwise would be a source of noise or less mechanical stability.

In a further embodiment said beam shaping and speckle reduction device 104 comprises a separate static diffractive optical element, configured to generate a shaped coherent light beam 114, so that a size A of a cross-section of said shaped coherent light beam 114 is adapted to a size of an active area 116 of said image generating micro-display 108. Within this embodiment the static diffractive optical element is used to shape the outer contour of the coherent light beam 114, whereas the dynamic diffractive optical element together with a processor 112 is used for the speckle reduction.

According to a further embodiment the dynamic diffractive optical element is controlled by the processor 112 so that said different hologram patterns generate a shaped coherent light beam 114, so that a size A of a cross-section of said shaped coherent light beam 114 is adapted to a size of an active area 116 of said image generating micro-display 108. Within this embodiment only one diffractive optical element is used, i.e. the dynamic diffractive optical element 110 is used for the beam shaping as well as for the speckle reduction.

According to a further embodiment the different hologram patterns are generated by shifting one hologram pattern laterally across a surface of said dynamic diffractive optical element 110. Such shifting of a hologram pattern is easily controlled by a processor 112. The hologram pattern can be used to shape the coherent light beam 114, so that a size A of a cross-section of said shaped coherent light beam 114 is adapted to a size of an active area 116 of said image generating micro-display 108.

According to a further embodiment said different hologram patterns are different Hadamard patterns, said Hadamard patterns are patterns with parts that are uncorrelated to each other.

In a further embodiment the processor is configured to change said different hologram patterns within said sequence faster than an integration time of a detector, which is considered to be located at the position of said image generating micro display 108. Due to the faster changes the detector integrates over different speckle patterns, thereby being illuminated more evenly. In a further embodiment this detector is the human eye. Within such embodiment a human observer of the image generated from the image generating micro display 108 is no longer disturbed by the speckle pattern resulting from the use of coherent light beams 114.

According to further embodiments said dynamic diffractive optical element might be a transmissive or a reflective micro display.

In a further embodiment the coherent light source comprises a laser. In illumination devices for illuminating an image generating micro display 108 with colored light, three lasers for different colors might be used, said illumination device comprising an optical combining element, e.g. a combining prisma, so that a combined light beam is generated and directed versus the beam shaping and speckle reduction device 104.

According to a further embodiment a color illumination device is provided with at least two beam shaping and speckle reduction devices and an optical combining element, located on an optical path between said beam shaping and speckle reduction devices and said image generating micro display, said optical combining element being configured to combine incident light from said at least two beam shaping and speckle reduction devices together onto an active surface of said image generating micro display.

In a further embodiment an image generation device is provided, comprising an illumination device as described above, an image generating micro display and a projection lens, wherein said image generating micro display is located on an optical path between said illumination device and said projection lens. With this embodiment an image, generated by said image generating micro display can be projected onto a screen without the disturbing speckle patterns, so that an observer of such generated images is not disturbed by noise resulting from said speckle patterns.

Figure 2:
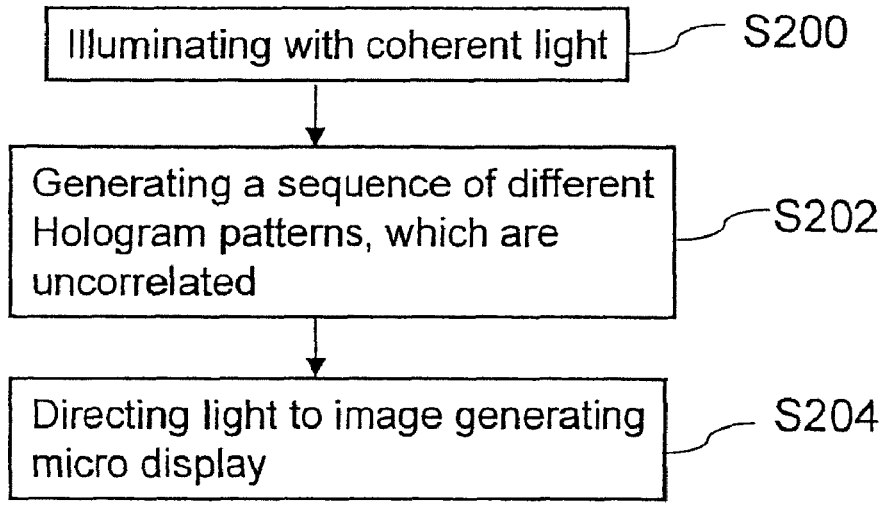
FIG. 2 shows steps according to a further embodiment of the invention.

In FIG. 2 method steps according to a further embodiment are depicted.

In a first step S200 a beam shaping and speckle reduction device 104 is illuminated with coherent light. Said coherent light might e.g. be emitted from a laser source.

In a second step S202 a sequence of different hologram patterns on at least a part of said beam shaping and speckle reduction device is generated, wherein said different hologram patterns are uncorrelated to each other. In a third step S204 emitted light 114 from said beam shaping and speckle reduction device 104 is directed to the image generating micro display 108.

In a further embodiment a computer program product is provided, which comprises a program code which when loaded into a processor is configured to generate a sequence of different hologram patterns on a dynamic diffractive optical element, wherein said different hologram patterns are uncorrelated to each other. As described above, such sequence of different hologram patterns on a dynamic diffractive optical element 104 may be used to reduce the speckle pattern on an image generating micro display.

Figure 3A:
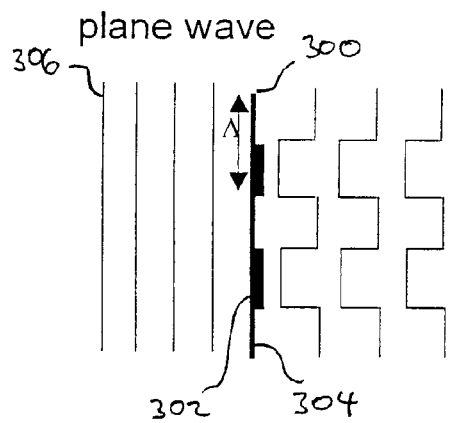
FIG. 3A shows a principle working function of a diffractive optical element.
Figure 3B:
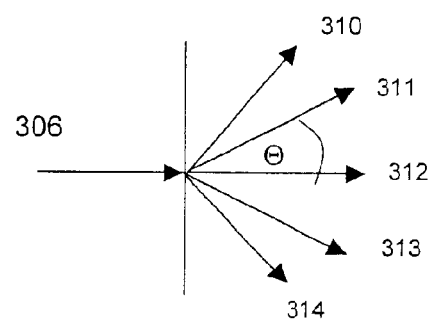
FIG. 3B shows different orders of diffraction caused by a diffractive optical element.

In FIGS. 3A and 3B the principle function of a diffractive optical element 300 is depicted. On such a diffractive optical element 300 a pattern is generated either statically or dynamically, which is depicted schematically in FIG. 3A by a structure with comprises first regions 302 and second regions 304, the first and second regions 302, 304 influencing incident light, which is depicted here as an incident plane wave 306 so that the plane wave 306 after passing the diffractive optical element 300 has been amplitude and/or phase modulated by the first and second regions 302, 304.

In FIG. 3B it is schematically depicted that an incoming wave 306 is diffracted into different directions 310, 311, 312, 313, 314 wherein one of the directions is the zero order diffraction (direction 312) and further directions 311, 313 are the first order diffraction and even further directions 310, 314 are the second order diffractions.

Figure 4:
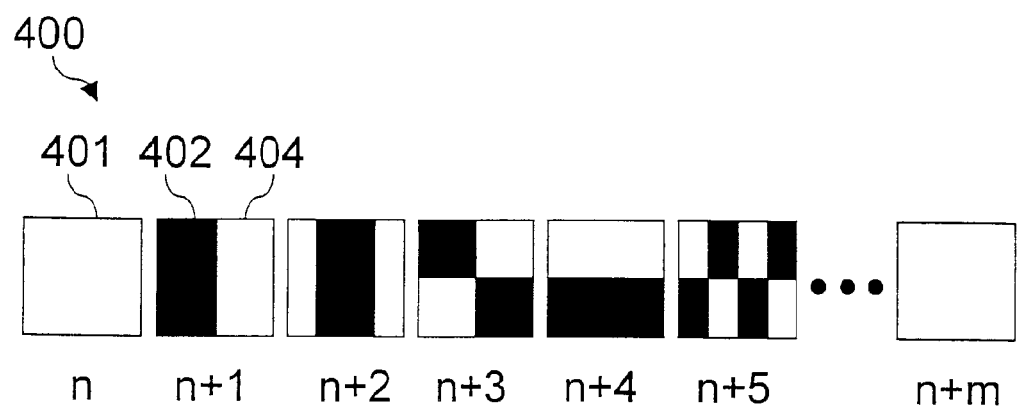
FIG. 4 shows a sequence of Hadamard-patterns.

In FIG. 4 a sequence 400 of hologram patterns 401 is depicted, wherein the sequence 400 comprises m different hologram patterns, Each hologram pattern has different regions 402, 404, wherein in FIG. 4 the first regions 402 might be considered as depicted in white and the second regions 404 might be considered as depicted in black. The difference between said first regions 402 and said second regions 404 might be a different phase and/or amplitude modulation of light passing through the corresponding regions. The different patterns 401 are obtained by controlling the dynamic diffractive optical element 110 from the processor 112.

The depicted hologram pattern 401 have the outer form of a square, each hologram pattern 401 within the sequence 400 being different from the other hologram patterns by a different distribution of first regions 402 and second regions 404 within the square. Each hologram pattern 401 within the sequence 400 is uncorrelated to the other hologram patterns 401 within the sequence 400 by using the possibilities of distributing the first regions 402 and second regions 404 in a 4×4 matrix in the square.

Such a sequence of uncorrelated patterns as depicted in FIG. 4 might also be referred to by "Hadamard" pattern. This Hadamard pattern is based on binary values. The 4×4 pattern is mapped of a (H16) Hadamard-matrix, which consists of M×M uncorrelated cells. After the sequence of hologram patterns 400 has been generated on the diffractive optical element 110, the sequence 400 might be restarted again or the order of the hologram patterns within the sequence 400 might be changed as well.

Figure 5:
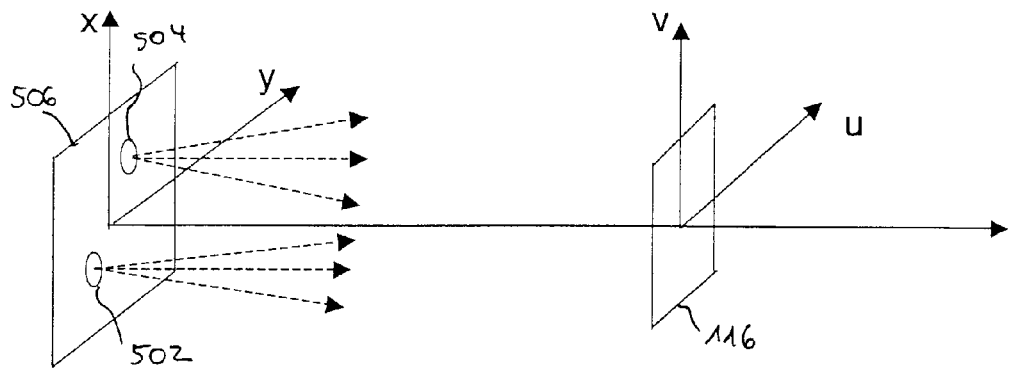
FIG. 5 is a schematic diagram to illustrate illuminating an image plane.

In FIG. 5 it is depicted schematically that even while using Hadamard patterns as depicted in FIG. 4, the whole active area 116 of an image generating micro display can be illuminated uniformly, because when building the beam shaping and speckle reduction device accordingly, each point 502 or 504 of a plane 506 of the beam shaping and speckle reduction device 104 can illuminate the whole active area 116 of the image generating and micro display 108. So even in case an amplitude modulation is used within the sequence 400 of hologram patterns, with the first region 402 being not transmissive and the second region 404 being transmissive, a uniform illumination of an active area 116 of an image generating micro display 108 may be achieved.

Figure 6:
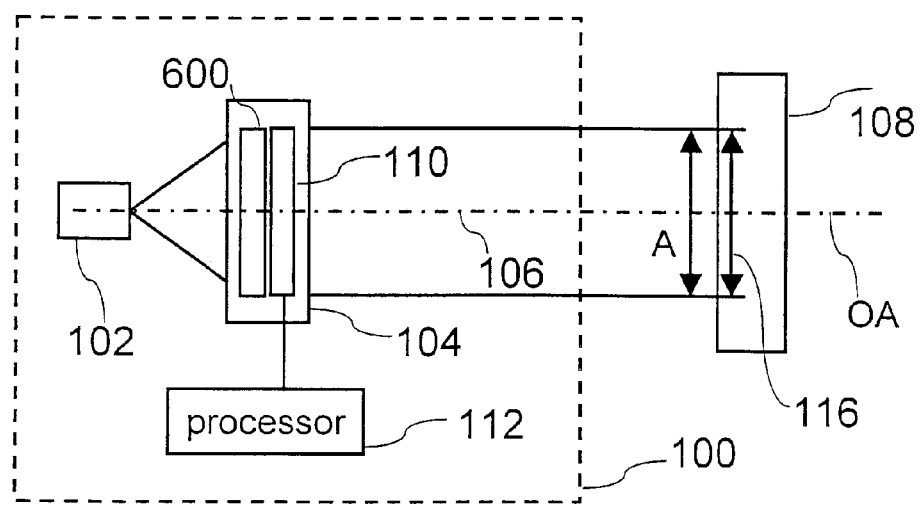
FIG. 6 shows another embodiment of an illumination device.

In FIG. 6 a further embodiment of an illumination unit 100 is depicted, which comprises a static diffractive optical element 600 within the beam shaping and speckle reduction device 104. Such static diffractive optical element 600 has a static hologram pattern on its surface, which static hologram pattern is used to shape light profile of the coherent light beam 114 to adapt it to the active surface of the image generating device 108. In this embodiment the dynamic diffractive optical element 110, which is controlled by the processor 112 is used to reduce the speckle pattern by changing, e.g. the hologram patterns as it is depicted in FIG. 4, faster than an integration time of a detector, which is considered to be situated at a position of the image generating micro display 108. While using M uncorrelated patterns within the integration time of this detector, which might be the human eye, the speckle noise can be reduced by a factor of the inverse square root of the number of uncorrelated hologram patterns $1/\sqrt{M}$ within the sequence 400.

Figure 7:
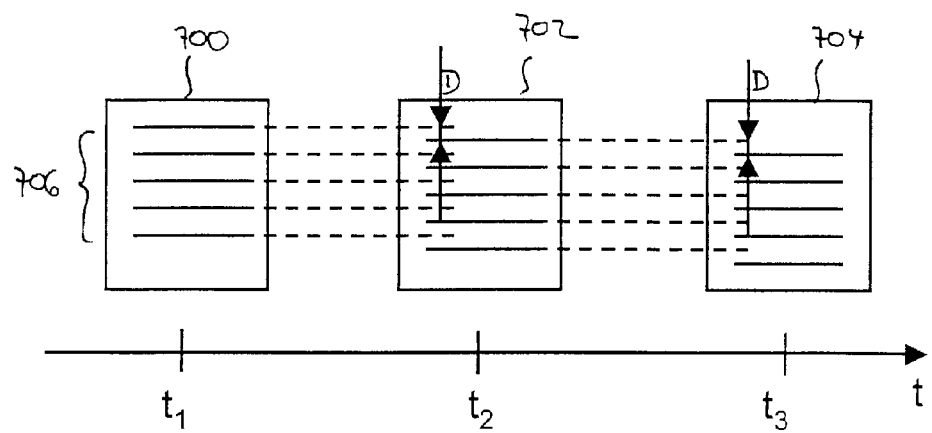
FIG. 7 shows a sequence of moving gratings in a sequence of hologram patterns.

In FIG. 7 a further embodiment for changing hologram patterns within a sequence is depicted. At different times t1, t2, t3 different hologram patterns 700, 702, 704 are generated on the dynamic diffractive optical element 110. Each of the hologram patterns 700, 702, 704 is adapted to shape the coherent light beam 114, so that its light profile is adapted to the active surface area of the image generating micro display 108. These different hologram patterns 700, 702, 704 are generated by shifting laterally a grating 706 across the surface of the dynamic diffractive optical element by a predefined distance d. Such distance d might be the same or a different distance between different hologram patterns which follow each other. With this embodiment there is realized a moving grating, without actually moving a device within the illumination unit. Besides a moving grating also a moving diffusing structure might be used accordingly to reduce the speckle noise on the image generating micro display.

Figure 8A:
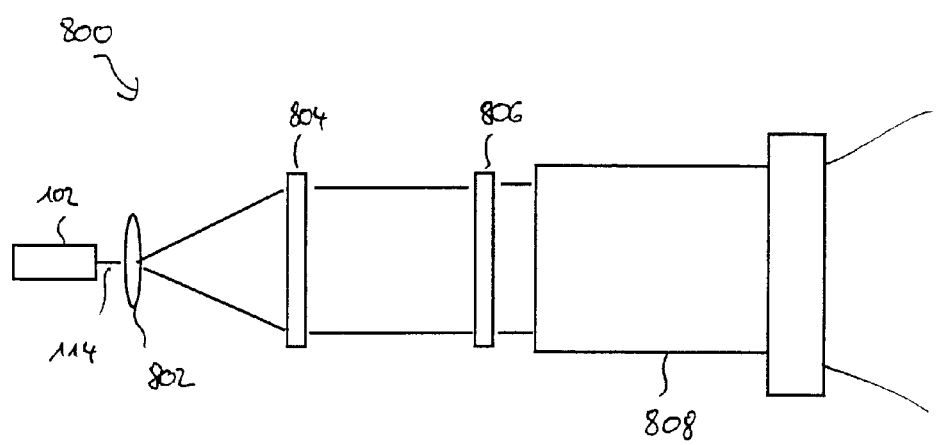
FIG. 8A shows an embodiment of an image generating device.

In FIG. 8A an embodiment of an image generating unit 800 is depicted. The coherent light beam 114 emitted by the coherent light source 102 is expanded by a beam expander 802 and illuminates a transmissive micro display 804, which is used as the beam shaping and speckle reduction element 104. The emitted light illuminates uniformly a transmissive image generating micro display 806 and the emitted light from the image generating micro display 806 is projected via a projection lens 808 to a screen (not depicted).

Figure 8B:
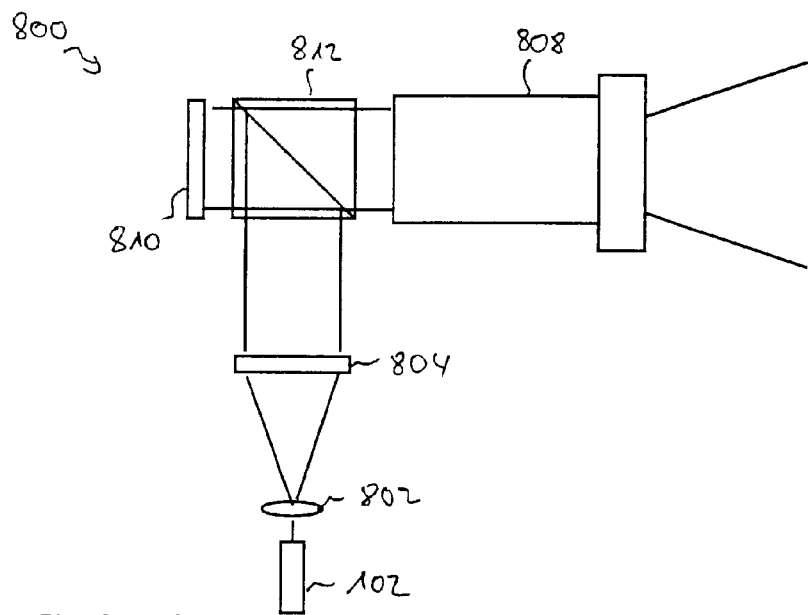
FIG. 8B shows a further embodiment of an image generating device.

In a further embodiment, depicted in FIG. 8B, the image generating unit 800 comprises the coherent light source 102, the beam expander 802, the transmissive micro display 804 as beam shaping and speckle reduction device and a prism 812 which directs the illumination light from the transmissive micro display 804 to a reflective image generating micro display 810. The emitted light from the reflective image generating device 810 passes the prism 812 and is projected by the projection lens 808 to a screen (not depicted).

Figure 8C:
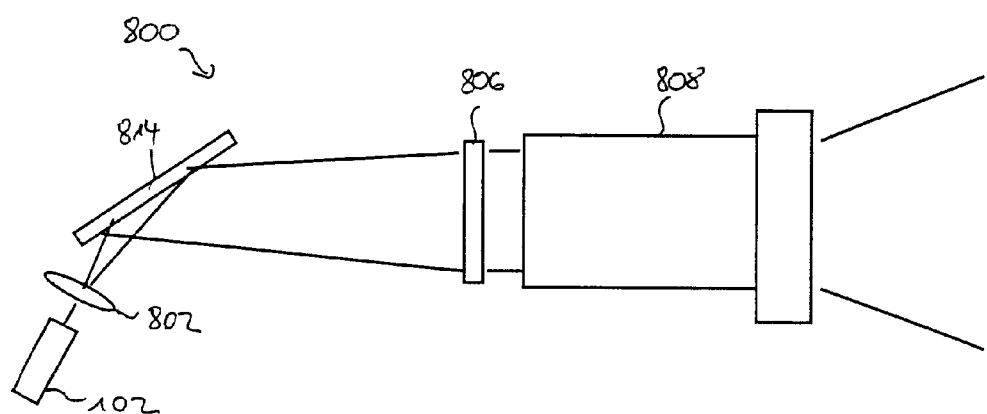
FIG. 8C shows a further embodiment of an image generating device.

In FIG. 8C a further embodiment of an image generating device 800 is depicted. This embodiment comprises the coherent light source 102, the beam expander 802 and a reflective micro display 814 as the beam shaping and speckle reduction device 104. Light emitted from the reflective micro display 814 is directed versus a transmissive image generating micro display 806 and afterwards projected by the projection lens 808 to the screen.

Figure 9:
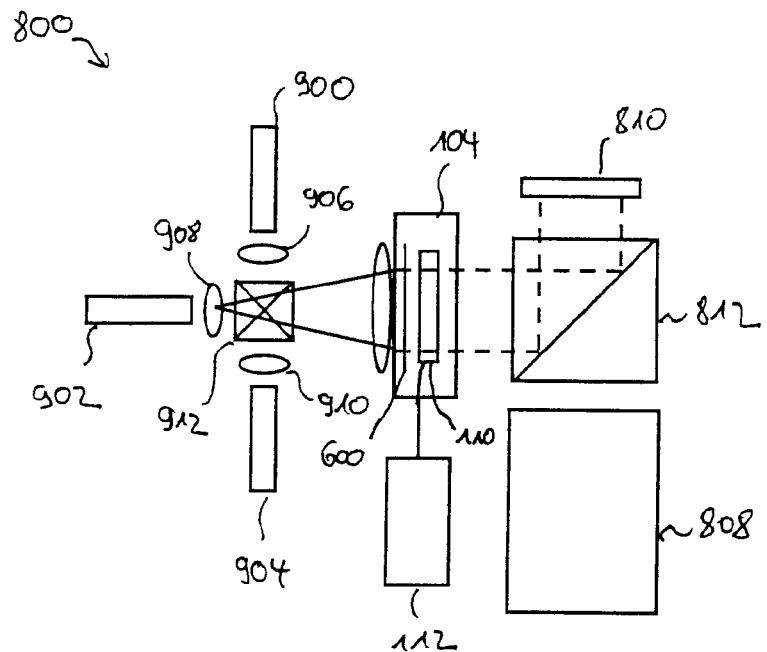
FIG. 9 shows a further embodiment of an image generating device.
Figure 10:
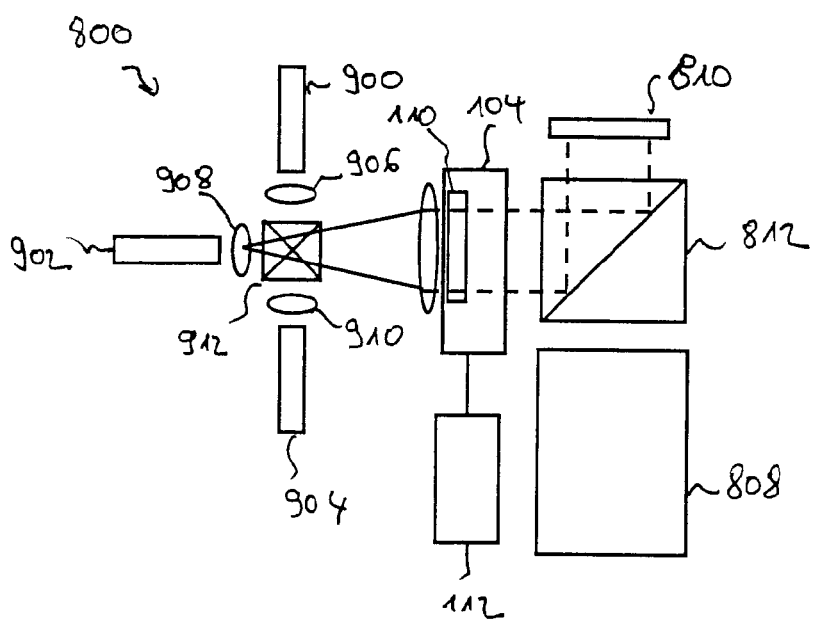
FIG. 10 shows a further embodiment of an image generating device.
Figure 11:
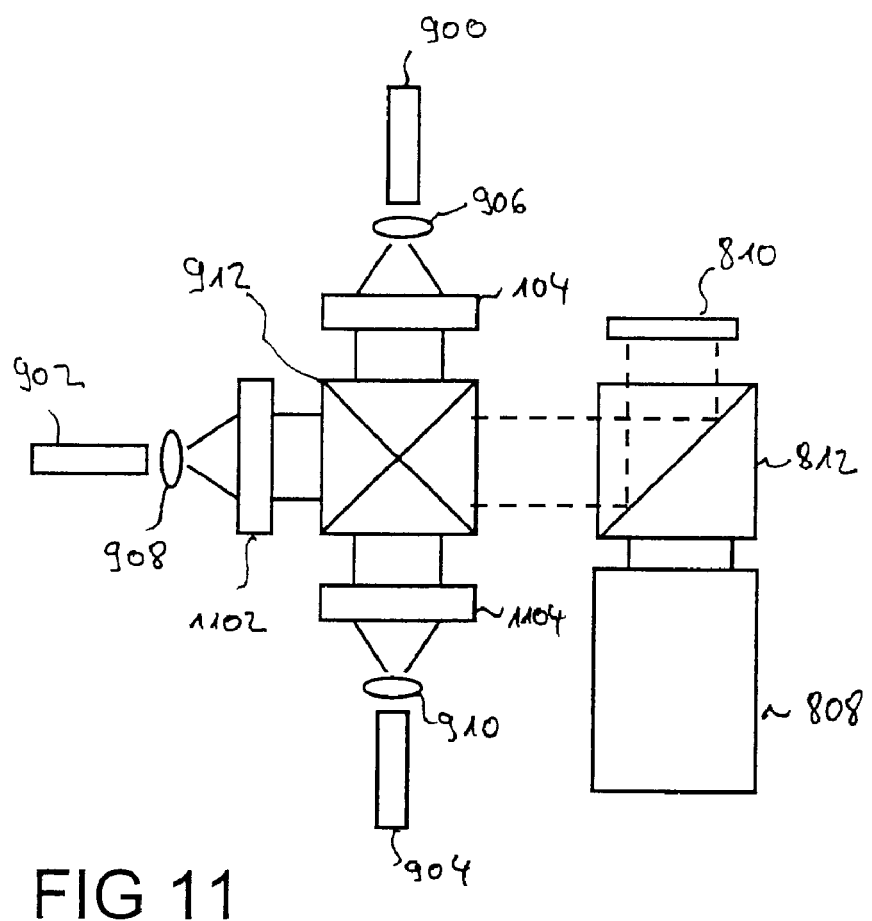
FIG. 11 shows a further embodiment of an image generating device.

In FIGS. 9 to 11 different embodiments for providing color illumination to an image generating micro display are depicted.

In a further embodiment of an image generating device 800 in FIG. 9 three lasers, e.g. a green laser 900, a red laser 902 and a blue laser 904 are located with an angle of 90° between them and their respective light is expanded by beam expanders 906, 908, 910 and combined by an optical combining element 912 and the combined light is emitted versus the beam shaping and speckle reduction device 104, which in this embodiment is comprising a dynamic diffractive optical element 110 and a static diffractive optical element 600. The emitted light from the beam shaping and speckle reduction device 104 is directed versus a prism 812 to the reflective image generating micro display 110 and afterwards projected by the projection lens 808 to a screen.

In a further embodiment depicted in FIG. 10 the same structure as depicted in FIG. 9 is used but the beam shaping and speckle reduction device 104 comprises only a dynamic diffractive optical element 110, controlled by the processor 112, so that the hologram patterns on the dynamic diffractive optical element 110 are used to reduce the speckle noise and in the same time are used to shape the light profile of the coherent light beam 114.

In FIG. 11 a further embodiment of a color image generation device 1100 is depicted. Within this embodiment the three lasers 900, 902, 904 each illuminates with their respective emitted light beam a separate beam shaping and speckle reduction device 104, 1102, 1104, before the shaped and speckle reduced beams are combined via the optical combining element 912 and directed via the prism 812 to the image generating micro display 810 and projected by the projection lens 808 to a screen (not depicted).

The following elucidations may help a person skilled in the art to get a better understanding of the invention:

The presented illumination setup comprises a laser light source which can be monochrome (single wave length) or can have more colors (wave length), an expanding lens, a micro display as phase modulator, one or more micro displays for generating images and a projection lens. Laser light is characterized to be very narrow band emitting source of high coherence (wave of lights are in phase). For projection systems usually the three colors red, blue, and green are used to reproduce colored images. Laser light is then expanded by a single lens onto the first fast switching micro display, which is used to modulate the light by its phase by using computer generated holograms (CGH). In other words the first micro display is used as a dynamic diffractive optical element (DOE). Laser light modulated by the micro display will change its light distribution characteristic related to the feature of diffractive element provided by the micro display.

By modulating the first micro display (DOE) different patterns will be generated at the second micro display, due to the high frame rate of changing patterns the light appears from the human eye uniformly distributed at a second micro display, which is containing the image information to be projected onto a screen.

Speckle would reduce image quality by applying a granular structure to the image. Granulation means very dark and very bright spots more or less randomly distributed over the observed image. Speckle contrast (noise) can be reduced by applying different patterns, with different phase information, which cause different speckle pattern at an image plane. The average of the time sequentially generated different speckle patterns reduces the speckle contrast. This means speckles (granulation) is a smooth out, which improves image quality.

Therefore a high amount of different speckle patterns at a short time is needed. Fast switching micro displays are used as phase modulators to alter the wave front phase. The effect can also be achieved with a moving diffuser, however the diffuser usually has a low efficiency (light is lost) and further the shape of a target illumination figure becomes blurred (washed out) edges, which results in further light reduction.

To have a high amount of patterns that differ enough in their phase (up to one wave length) special patterns have to be generated. Speckle patterns must be uncorrelated and independent from each other, to reduce speckle contrast and smooth out the image.

For example Hadamard patterns can help to generate uncorrelated phase patterns. These Hadamard patterns are based on binary values. The 4×4 pattern is mapped of a (H16) Hadamard-matrix, which consists of M×M uncorrelated cells. The speckle reduction is determined by $1/\sqrt{M}$. A corresponding speckle reduction might also be obtained for any other sequence of uncorrelated phase patterns. These uncorrelated_phase patterns just reduce speckle, in addition a static diffractive optical element in the diffuser or re-mapping type for beam shaping is used.

A further embodiment shows usage of one dynamic diffractive optical element from beam shaping and speckle reduction. In this case the pattern is generated at a dynamic diffractive optical element, which is a first micro display acting as a phase modulator. This dynamic diffractive optical element is a grating/diffuser type of diffractive optical element having periodic structures. As for the diffuser type elements of input (first micro display) and output (imager planes) are connected through Fourier transformation, each point of an input plane contributes to all points of an output plane. Usually diffractive optical elements with periodic structures are moving in one or two direction perpendicular to the optical axis, by keeping their position along the optical axis to reduce speckle contrast. By using the micro display as dynamic diffractive optical element this movement can be simulated by shifting the diffractive structure over the micro display active area. If the movement is faster than resolvable by the human eye, a flicker free illumination of the imager is obtained.

With a proposed illumination device and illumination method a simple optical setup for illumination of a micro display is achieved by using a smaller number of optical components. A single component achieves the beam shaping for display illumination and interference (speckle) reduction. No moving parts like rotating or vibrating diffusers to reduce the visibility of the speckle patterns are used. Less optical components and no moving diffusing parts enhance the system efficiency. Using computer generated holograms provided by micro displays offers a high degree of design freedom for several illumination applications independent of display size, shape and aspect ratio, which is to illuminate.

The invention claimed is:

1. An illumination device for uniformly illuminating an image generating micro-display, comprising:
    a coherent light source;
    a beam shaping and speckle reduction device located on an optical path between said coherent light source and said image generating micro-display, wherein said beam shaping and speckle reduction device includes a dynamic diffractive optical element that is configured to diffract an incoming wave from the coherent light source into different directions; and
    a processor configured to control said dynamic diffractive optical element so that a sequence of different hologram patterns is generated on said dynamic diffractive optical element, said different hologram patterns being uncorrelated to each other, said different hologram patterns being configured to generate a shaped coherent light beam, wherein a size of a cross-section of said shaped coherent light beam is equivalent to a size of an active area of said image generating micro-display.

2. The illumination device according to claim 1, wherein said beam shaping and speckle reduction device further comprises:
    a static diffractive optical element configured to generate a shaped coherent light beam, wherein a size of a cross-section of said shaped coherent light beam is equivalent to a size of an active area of said image generating micro-display.

3. The illumination device according to claim 1, wherein said processor is configured to control said dynamic diffractive optical element so that said different hologram patterns are generated by shifting one hologram pattern laterally across a surface of said dynamic diffractive optical element.

4. The illumination device according to claim 1, wherein said processor is configured to change said different hologram patterns during said sequence faster than an integration time of a detector located at a position of said image generating micro-display.

5. The illumination device according to claim 4, wherein said detector is a human eye.

6. The illumination device according to claim 1, wherein said dynamic diffractive optical element is a transmissive micro-display.

7. The illumination device according to claim 1, wherein said dynamic diffractive optical element is a reflective micro-display.

8. The illumination device according to claim 1, wherein said coherent light source includes a laser.

9. The illumination device according to claim 8, wherein said coherent light source includes three lasers for different colors; and
    said illumination device further includes an optical combining element, which is configured to combine emitted light of the three lasers to generate a combined light beam and to emit the combined light beam in the direction of said beam shaping and speckle reduction device.

10. A color illumination device for uniformly illuminating an image generating micro-display with different colors, comprising:
    at least two illumination devices according to claim 1; and
    an optical combining element located on an optical path between said beam shaping and speckle reduction devices and said image generating micro-display, said optical combining element being configured to combine emitted light from said at least two beam shaping and speckle reduction devices onto an active surface of said image generating micro-display.

11. An image generation device, comprising:
    an illumination device according to claim 1;
    an image generating micro-display; and
    a projection lens, wherein said image generating micro-display is located on an optical path between said illumination device and said projection lens.

12. A method for illuminating uniformly an image generating micro-display, comprising:
    generating a sequence of different hologram patterns on at least a part of a beam shaping and speckle reduction device, wherein said different hologram patterns are uncorrelated to each other;
    illuminating the beam shaping and speckle reduction device with coherent light;
    diffracting, at the beam shaping and speckle reduction device, the coherent light into different directions; and
    directing emitted light from said beam shaping and speckle reduction device to said image generating micro-display, wherein
    said different hologram patterns are chosen to generate a shaped beam of said coherent light, wherein a size of a cross-section of said shaped coherent light beam is equivalent to a size of an active area of said image generating micro-display.

13. The method according to claim 12, further comprising:
    generating said different hologram patterns by shifting one hologram pattern laterally across a surface of a dynamic diffractive optical element.

14. The method according to claim 12, further comprising:
changing the hologram patterns within the sequence faster than the integration time of a detector, the detector being located at a position of said image generating micro-display.

15. The method according to claim 14, wherein said detector is a human eye.

16. A non-transitory computer-readable medium storing computer instructions thereon that when executed by an illumination device cause the illumination device to perform a method comprising:
generating a sequence of different hologram patterns in a dynamic diffractive optical element that diffracts an incoming wave into different directions, said different hologram patterns being uncorrelated to each other, said different hologram patterns being configured to generate a shaped coherent beam, wherein
each of said different hologram patterns includes different regions, being disposed in a (n x m) matrix, first and second regions being distributed in an uncorrelated manner in the matrix, wherein n and m>1.

17. The illumination device according to claim 1, wherein the processor is configured to control said dynamic diffractive optical element so that a sequence of different hologram patterns resulting in a different amplitude modulation of light passing through corresponding regions is generated on said dynamic diffractive optical element.

18. The method for illuminating uniformly an image generating micro-display according to claim 12, wherein a sequence of different hologram patterns causing a different amplitude modulation of light passing through corresponding regions is generated.

19. The illumination device according to claim 17, wherein the different hologram patterns have different phases.

20. The illumination device according to claim 17, wherein the different regions result in a different amplitude modulation of light passing through the corresponding regions.

21. The method for illuminating uniformly an image generating micro-display according to claim 12, wherein each of said different hologram patterns includes different regions, being disposed in a (n x m) matrix, first and second regions being distributed in an uncorrelated manner in the matrix, wherein n and m>1.

22. The method for illuminating uniformly an image generating micro-display according to claim 21, wherein the different hologram patterns have different phases.

23. The method for illuminating uniformly an image generating micro-display according to claim 21, wherein the different regions result in a different amplitude modulation of light passing through the corresponding regions.

* * * * *